No. 701,786. Patented June 3, 1902.
E. D. BARTLETT.
PHOTOGRAPHIC CAMERA.
(Application filed Mar. 11, 1902.)

(No Model.) 3 Sheets—Sheet 1.

Witnesses
Nathan C. Day.
Edith J. Anderson.

Inventor
Edwin Drew Bartlett
per S Macleod Calver & Randall
Attorneys

THE NORRIS PETERS CO., PHOTO-LITHO., WASHINGTON, D. C.

No. 701,786. Patented June 3, 1902.
E. D. BARTLETT.
PHOTOGRAPHIC CAMERA.
(Application filed Mar. 11, 1902.)
(No Model.) 3 Sheets—Sheet 2.
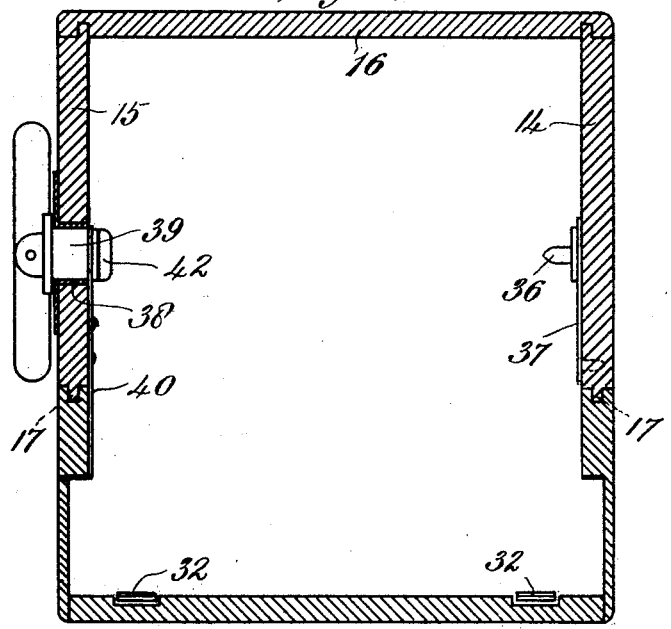
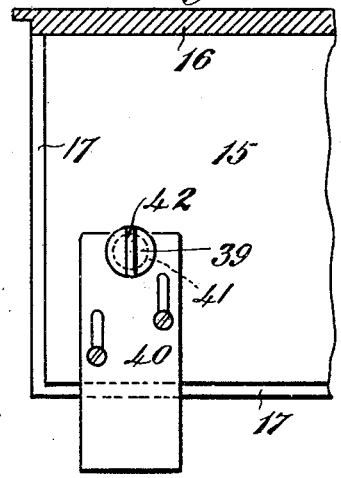
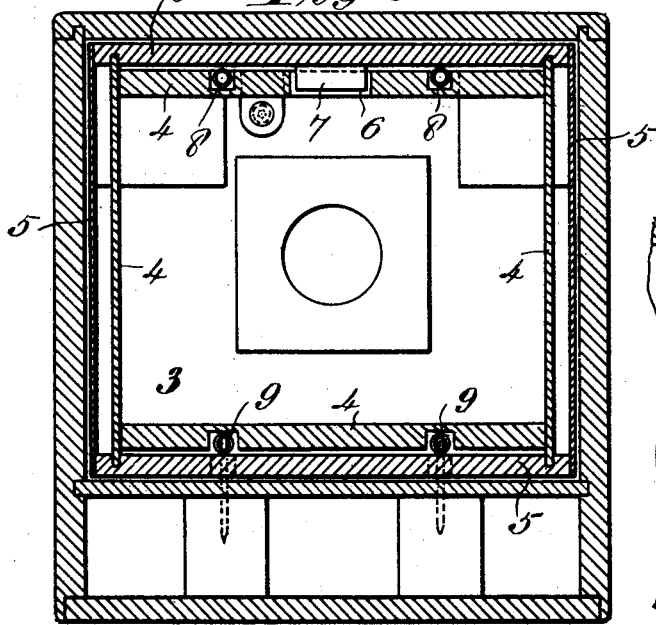
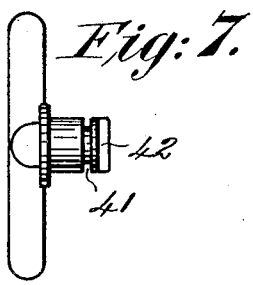
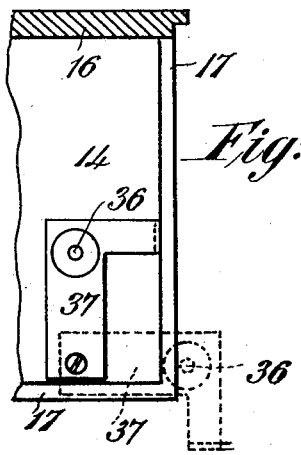
Witnesses
Nathan B. Day
Edith J. Anderson
Inventor
Edwin Drew Bartlett
per Macleod Calver & Randall
Attorneys
THE NORRIS PETERS CO., PHOTO-LITHO., WASHINGTON, D. C.

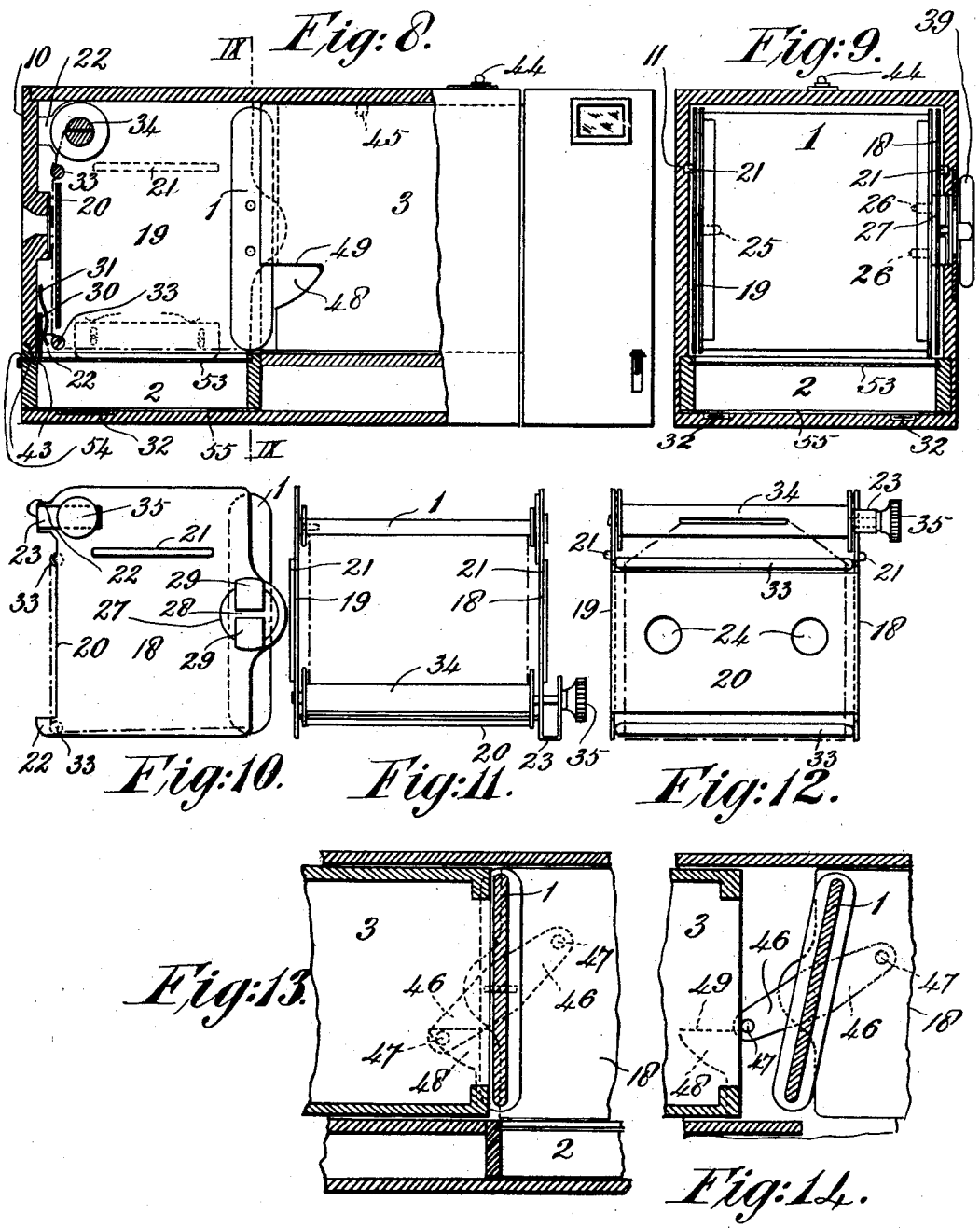

UNITED STATES PATENT OFFICE.

EDWIN DREW BARTLETT, OF SOUTH TOTTENHAM, LONDON, ENGLAND.

PHOTOGRAPHIC CAMERA.

SPECIFICATION forming part of Letters Patent No. 701,786, dated June 3, 1902.

Application filed March 11, 1902. Serial No. 97,722. (No model.)

*To all whom it may concern:*

Be it known that I, EDWIN DREW BARTLETT, a subject of the King of England, residing at 84 Tynemouth road, South Tottenham, in the county of London, England, have invented certain new and useful Improvements in Photographic Cameras, of which the following is a specification.

The present invention relates to photographic cameras of the type described in a former application for patent filed by me November 14, 1901, and bearing Serial No. 82,259, the camera forming the subject-matter of the present case being designed to permit easy and rapid loading and unloading of the camera, to allow ready access to the film-carrier, its supports, and associated parts, and to control and reduce the movements of the lens-carrier.

Figure 1:
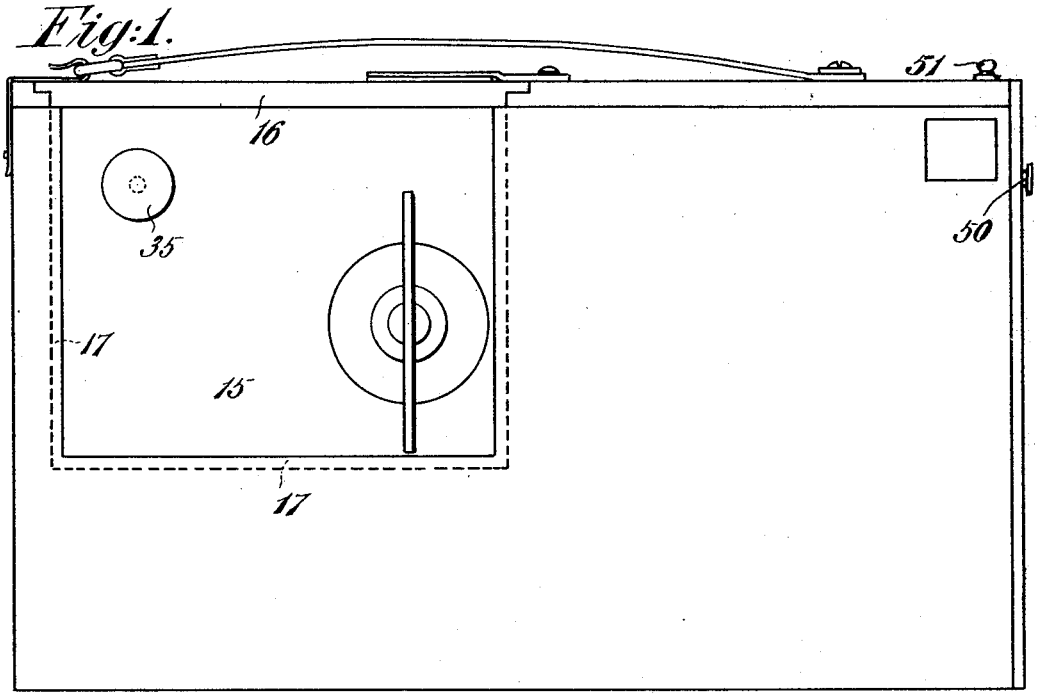
Figure 2:
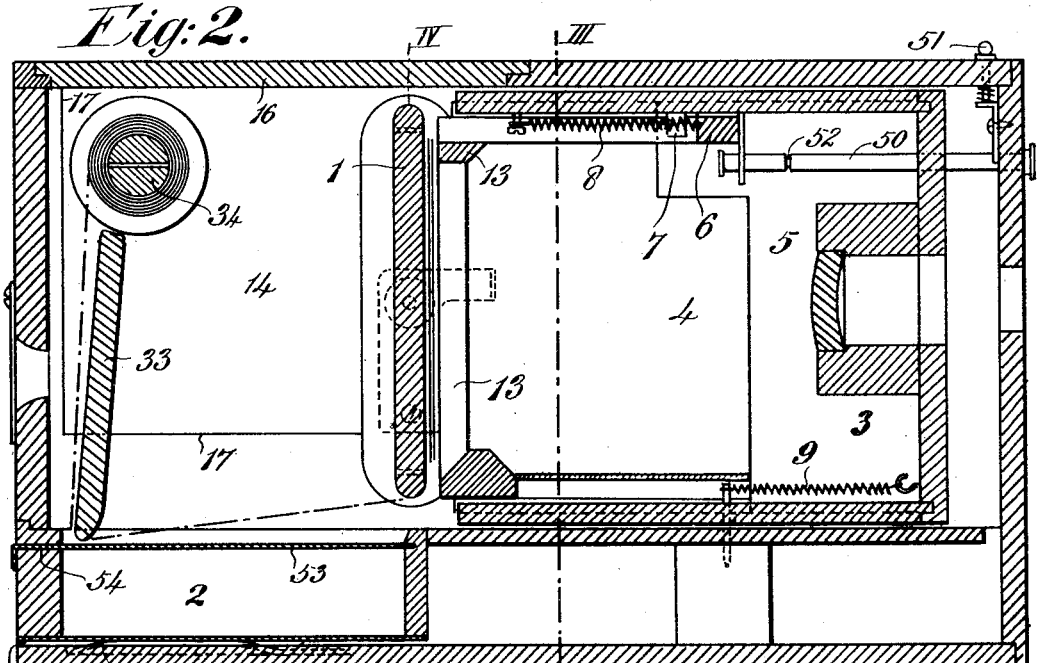

In the drawings herewith, Figure 1 is a side elevation of a camera embodying my invention. Fig. 2 is a central longitudinal section of the camera shown in Fig. 1. Fig. 3 is a transverse sectional view on line III III, Fig. 2. Fig. 4 is a transverse sectional view on line IV IV, Fig. 2, the interior parts being removed from the case. Figs. 5, 6, and 7 are detail views of the film-carrier supports and turning-key. Fig. 8 is a view, partly in section, of a camera provided with a slightly-different form of removable section than that shown in Figs. 1 and 2. Fig. 9 is a transverse sectional view on line IX IX, Fig. 8. Figs. 10, 11, and 12 are side, plan, and end views, respectively, of the removable section shown in Fig. 8. Figs. 13 and 14 are detail views of the lens controlling and operating device.

The type of camera hereinafter more particularly referred to usually comprises, chiefly, a rotary film-carrier 1, a film-receptacle 2, and a sliding lens-carrier 3. According to this invention the film-carrier 1 is mounted in a removable section of the camera, so as to enable an empty carrier to be more readily removed and a loaded carrier to be inserted in its place. Referring to Figs. 1 to 5 of the drawings, the film-carrier or spool 1 is mounted in a removable section, which comprises portions 14 15 of the side walls of the camera and a portion 16 of the roof of the camera. The edges of the removable section are formed with ribs or tongues 17 in order to make light-tight joints with the body of the camera. The film-carrier or spool 1 is mounted in this removable section preferably in the following manner: A pivotal pin 36 is carried upon an arm 37, pivoted to or sliding upon the inner face of the side-wall portion 14. The opposite portion 15 is formed with a hole or bearing 38 for a turning-key 39, which may be kept in place therein by means of a sliding catch-piece 40, adapted to engage with a groove 41, formed in the stem of the key 39. A recess in one end of the film-carrier is first engaged with the pivot-pin 36, the arm 37 being in the extended position, as shown in dotted lines in Fig. 6. The arm 37 and the film-carrier or spool are then moved back until a recess in the opposite end of the spool registers with the hole 38, and the key 39 is then inserted and caused to engage, by means of a projection 42, with the said recess, and the catch 40 is operated to retain the key in position. The removable section may also have mounted within it a winding-roller 34 for operating and a guide device 33 for guiding the paper band which is employed for releasing the films.

Within the forward part of the camera-box is mounted the sliding lens-carrier 3, and in order to decrease the amount of reciprocating movement of the lens-carrier 3 the latter is made collapsible. In Figs. 2 and 3 it is shown made in two portions 4 5, which move relatively with one another when the film-carrier is turned. The portion 4 can slide within the portion 5, but is limited in its outward movement by a stop 6 upon the portion 4 coming into contact with a stop 7 upon the portion 5. When these stops are in contact, the maximum length of lens-carrier is obtained, which length corresponds approximately to the focul length of the lens. Obviously by providing for any suitable adjustment of the stops 6 and 7 a variation in the focus of the camera could be secured. Springs 8, connected to the two pieces 4 and 5, are arranged to keep the stops 6 and 7 normally in contact and to thus maintain the uniform length of the lens-carrier. Other springs 9 are arranged to move the lens-carrier 3 in a rearward direction in order to maintain the end thereof in contact with the film-support 1. When the latter is turned, it will exert a camming action against the framing 13 of the sliding portion 4 and will cause it to move into the portion 5. The latter may also move a slight amount, which will depend upon the relative strength of the springs 8 and 9. As will be well understood, the amount of space required for the movement of the lens-carrier 3 is considerably reduced according to this construction, owing to the greater part of the movement being a relative one between the two portions of the lens-carrier. Various modifications might be made in the construction of this form of collapsible lens-carrier in accordance with this invention, any device which can be collapsed and made to resume a uniform length being embraced within the scope of this invention.

The collapsible lens-carrier may be maintained in an extreme forward position during loading and unloading by means of a sliding rod 50, passing through the front of the camera and connected to the portion 4 of the lens-carrier, and a catch 51, adapted to automatically engage with a recess 52, formed in the rod.

Instead of having the removable section comprise portions of the side walls and top of the box or casing, as shown in Figs. 1 and 2, it may consist of an inner casing comprising side portions 18 19 and an open end portion 20. (See Figs. 8 to 12.) This inner section may be conveniently formed of sheet metal having its interior surface free from projections or obstructions. It will thus form not only a convenient means for withdrawing the film-carrier, but will also prevent the films from lodging upon or from being obstructed by any projections or irregularities upon the interior surface of the camera. The casing or section may be supported in the camera in any convenient manner above the film-receptacle 2, as in the manner illustrated in Figs. 8 and 9, wherein the casing is supported by means of ribs 21, sliding in grooves 11 in the sides of the camera-box, and the said receptacle 2 is shown to be supported upon blade-springs 32, which serve to keep the top edges thereof in close proximity to the lower edges of the casing or section. The back 10 of the camera only extends down as far as the receptacle 2, a light-tight joint being made by means of a fillet upon the upper edge of the receptacle engaging with a groove in the lower edge of the back 10. Lugs or distance-pieces 22 are formed upon the rear of the removable section, and the back 10 bears against these in order to maintain the section in its proper position. A projecting strip 23 or filling-piece may be provided to fit and close the slot, which is required to be made in one side of the camera when the winding-up roller 34 has a projecting thumb-nut 35 secured to its spindle, as illustrated in Figs. 10 to 12. Apertures 24 may be formed in the rear wall 20 of the removable section, or suitable projections may be fitted thereto to provide for the ready grasping and withdrawal of the section by the finger and thumb of the operator. The film-carrier is supported at one side of the section upon a pin 25 and upon the opposite side upon two pins 26 26, which enter recesses formed in the ends of the carrier. The pins 26 are carried upon a coupling device consisting of a rotary disk 27, mounted in the wall 18 of the removable section. The disk 27 may have a slot 28, formed conveniently by two pieces 29, positioned so as to inclose the groove or slot 28 between them. When the removable section is slid into position in the camera, the groove or slot 28 is brought into engagement with a projection 42 upon a turning-key 39, rotatably mounted in the side wall of the camera. If preferred, this construction may be reversed and the key may be recessed and the coupling-disk 27 may be formed with the projection. Guide-rollers 33 and a winding-up roller 34 may be mounted in bearings in the side walls 18 19, the flexibility of the material of which the walls are composed being usually sufficient to secure them in position. The lid 53 of the receptacle is preferably drawn out from the latter through a light-tight slot 34, formed therein. It may then be conveniently inserted into the space 55 between the bottom of the receptacle and the bottom of the camera and above the blade-springs 32, which serve to retain it in place.

A vertically-movable strip 30 is shown in Fig. 8 fitted to the back of the camera, against which it is pressed flat by blade-springs 31. This strip is adapted to be moved downward by springs such as are shown in connection with the strips 56 when the lid has been withdrawn from the receptacle 2 in order to cover the broken surfaces 43 in the rear wall of the drawer and prevent any films from catching thereon. The said similar spring-pressed strips 56 are fitted to the sides of the removable section, as shown in dotted lines in Fig. 8, for the purpose of covering the grooves in the side walls of the drawer.

When the removable section and the spool or film-carrier 1 are being withdrawn or inserted during unloading or loading, the lens-carrier 3 should be held in a forward position in order that it may offer no hindrance to the positioning of the said parts, and for this purpose a spring-catch 44, Fig. 8, is provided upon the casing of the camera and is adapted to automatically engage a suitable recess or device 45 upon the lens-carrier 3 when the latter is pulled into an extreme forward position in a manner similar to the action of the catch device 51, Fig. 1.

Figs. 8, 13, and 14 illustrate a device for operating and controlling the lens-carrier 3 in such a manner that the carrier is arrested in its rearward movement until the film-carrier has arrived at a vertical position, at which moment the lens-carrier is released and is brought into contact with the film-carrier. By this method any danger of buckling or catching the foremost film upon the carrier, due to rolling contact between the lens-carrier and the film-carrier, is obviated. The said device comprises two arms 46, capable of turning about the axis of rotation of the film-carrier and each provided with a pin 47, adapted to bear against the extreme edge of the lens-carrier or against a cam-plate fitted thereto. The arms are secured to their axis at an angle to the film-carrier or spool 1, the latter being in advance. The said end of the lens-carrier or cam-plate has a cut-away portion 48, in which one of the pins 47 lies when the film-carrier is in a vertical position, as shown in Fig. 13. When the film-carrier is turned, it cams against the end of the lens-carrier, moving the latter forward through the first ninety degrees of movement and then permitting it to return. When, however, the lens-carrier arrives at a certain point, the end thereof or the cam-plate thereupon comes into engagement with the pin 47, which arrests its movement, as shown in Fig. 14, until the film-carrier is approximately in a vertical position, when the said pin 47 comes beneath the straight edge portion 49 of the cam-surface, thereby allowing a quick completion of the return movement of the lens-carrier. It is obvious that numerous other constructions to delay the return of the lens-carrier might be adopted, such as a rotary cam device mounted upon the axis of the spool and coöperating with pins or projections suitably disposed on the lens-carrier, or any suitable automatic catch to arrest the lens-carrier, said catch being automatically released when the spool assumes the vertical position, could be employed.

I claim—

1. In a camera, the combination with a camera-box; of a removable section mounted in said box; a film-carrier carried by said section; and a collapsible lens-carrier mounted in said box.

2. In a camera, the combination with a camera-box; of a removable section mounted in said box; a rotary film-carrier carried by said section; and a sliding lens-carrier mounted in said box.

3. In a camera, the combination with a camera-box; of a removable section mounted in said box; a rotary film-carrier carried by said section; and a collapsible, sliding lens-carrier mounted in said box.

4. In a camera, the combination with a camera-box; of a removable section mounted in said box; a rotary film-carrier carried by said section; and a collapsible, sliding lens-carrier composed of telescoping portions mounted in said box.

5. In a camera, the combination with a camera-box, of a removable section mounted in said box; a rotary film-carrier carried by said section; a rotary film-carrier-operating device in the wall of said section; and a collapsible lens-carrier mounted in said camera-box.

6. In a photographic camera, the combination with a camera-box; of a removable section carrying the film-support mounted in said box; horizontal ribs on said section for supporting it within said box; and distance-pieces for maintaining said section in proper position.

7. In a photographic camera, the combination with a camera-box; of a removable section carrying the film-support mounted in said box; horizontal ribs on said section for supporting it within the said box; and a film-receptacle beneath said removable section.

8. In a photographic camera, the combination with a camera-box; of a removable section carrying the film-support mounted in said box; horizontal ribs on said section for supporting it within the said box; a film-receptacle beneath said removable section; and light-excluding strips carried by said removable section.

9. In a photographic camera, the combination with a camera-box; of a removable section carrying the film-support mounted in said box; horizontal ribs on said section for supporting it within the said box; a film-receptacle beneath said removable section; and spring-pressed light-excluding strips carried by said removable section.

10. In a photographic camera, the combination with the camera-box; of a removable section carrying the film-support mounted within said box; horizontal ribs on said section for supporting it within said box; distance-pieces for maintaining it in proper position therein; and a rotary coupling device to form a connection between the film carrier or support and a turning-key.

11. In a photographic camera, the combination with a camera-box; of a removable section carrying the film-support; horizontal ribs on said section for supporting it within said box; distance-pieces for maintaining it in proper position; a film-receptacle beneath said removable section; a rotary coupling device to form a connection between said film-carrier and a turning-key; and a winding-roller carried by said removable section.

12. In a photographic camera, the combination of a camera-box; of a removable section mounted in said box, a film-support carried by said removable section; a film-receptacle; and sliding light-excluding strips bridging the opening between said receptacle and said removable section.

13. In a photographic camera, the combination with a removable section; of a film-support mounted therein; and a spring-pressed film-receptacle beneath said removable section.

14. In a photographic camera, the combination of a film-support and a collapsible sliding lens-carrier.

15. In a photographic camera, the combination of a film-support and a collapsible sliding lens-carrier composed of telescope portions.

16. In a photographic camera, the combination of a film-support; a collapsible sliding lens-carrier comprising two relatively movable portions; means for maintaining the portions in an extended position; and means for moving the lens-carrier in a rearward direction, substantially as set forth.

17. In a photographic camera, the combination of a film-support; a collapsible sliding lens-carrier comprising two relatively movable portions, stops upon each of the portions; a spring for operating the portions so as to maintain the stops in contact with one another; and a spring for moving the lens-carrier bodily in a rearward direction, substantially as set forth.

18. In a photographic camera, the combination of a film-support; a collapsible sliding lens-carrier; and means for temporarily maintaining the said carrier in a collapsed condition, substantially as set forth.

19. In a photographic camera, the combination with a sliding lens-carrier, of means for moving said lens-carrier; and a cam device designed to temporarily delay the return movement of the carrier, substantially as set forth.

20. In a photographic camera, the combination with a sliding lens-carrier, of a locking device for maintaining the lens-carrier in one of its extreme positions, substantially as and for the purpose set forth.

21. In a photographic camera, the combination of a sliding lens-carrier, a rotatable film-support for operating the carrier and a device for momentarily arresting the carrier in its return movement, substantially as and for the purpose set forth.

In testimony whereof I have hereunto signed my name to this specification in the presence of two subscribing witnesses.

EDWIN DREW BARTLETT.

Witnesses:
LEONARD E. HAYNES,
ERNEST F. FOTHERGILL.